United States Patent [19]
Lorenz

[11] Patent Number: 5,187,653
[45] Date of Patent: Feb. 16, 1993

[54] CURRENT LIMITING DEVICE

[75] Inventor: William M. Lorenz, Saugerties, N.Y.

[73] Assignee: International Business Machines Corporation, Armonk, N.Y.

[21] Appl. No.: 577,346

[22] Filed: Sep. 4, 1990

[51] Int. Cl.[5] .............................................. H02M 7/04
[52] U.S. Cl. ...................................... 363/89; 323/908; 361/91
[58] Field of Search ................ 323/901, 908, 277, 278; 361/58, 86, 87, 90, 91; 363/53, 49, 89

[56] References Cited

U.S. PATENT DOCUMENTS

| | | | |
|---|---|---|---|
| 3,913,002 | 10/1975 | Steigerwald | 323/24 |
| 3,935,511 | 1/1976 | Boulanger et al. | 361/58 |
| 3,935,527 | 1/1976 | Michelet | 321/11 |
| 4,278,930 | 7/1981 | Rogers | 323/277 |
| 4,396,882 | 8/1983 | Kellenbenz | 361/58 |
| 4,519,024 | 5/1985 | Federico et al. | 363/89 |
| 4,631,470 | 12/1986 | Bingley | 323/282 |

OTHER PUBLICATIONS

IBM TDB, 24-3, Aug. 1981, pp. 1437-1438, C. Driscoll/M. Waechter, "Active Transient Supressor for Line-Operated Switching Regulator".
IBM TDB, 25-2, Jul. 1982, p. 470, J. Kinnard, "Power Supply Inrush Current Limiter/Clamp Circuit".
IBM TDB, 28-8, Jan. 1986, pp. 3283-3284, "Surge Current Limiting for Power Supply".
Unitrude Applications Handbook, 1987-1988, pp. 379-382.

*Primary Examiner*—Steven L. Stephan
*Assistant Examiner*—Adolf Berhane
*Attorney, Agent, or Firm*—Mark S. Walker

[57] ABSTRACT

A current limiting circuit for limiting current surges caused by device turn-on and by input line voltage surges. The circuit has a current sensor for sensing current surges and causing the current to be routed through a current limiting device, such as a resistor. The current sensing circuit senses both over current and normal current conditions and resets the current limiting switch as appropriate. The use of a current sensor as opposed to a sensor for turn-on conditions or voltage levels provides actual control of the current thereby protecting the electrical device during the first application of power and from AC line voltage surges.

7 Claims, 2 Drawing Sheets

CURRENT LIMITING DEVICE

BACKGROUND OF THE INVENTION

1. Field of the Invention

The present invention relates to electrical power supply or regulation systems, and more particularly, to current limiting devices for such systems. In particular, the present invention relates to a circuit providing current limiting capabilities to limit in-rush current and current surges during operation.

2. Background of the Invention

Power supplies for computers and other digital devices typically accept an AC current source, and convert it into a DC current source for operation of the device. The AC source is rectified to produce high voltage DC power which is regulated to the voltage level necessary for operation of the electronic device. A simplified diagram of such a power supply 90 is shown in FIG. 1. The AC line current is connected to rectifier 100 that produces rectified DC voltage which appears across the DC load 102. Filter capacitor 104 is provided to smooth the regulated DC voltage, ensuring a constant voltage across load 102.

When the power supply 90 is first turned on, the voltage across capacitor 104 will be zero while the voltage at the output of rectifier 100 will be the maximum produced by the AC line source. The difference between the AC line source voltage and voltage across capacitor 104 can be represented as VMAX. The initial large difference in voltage will create high current flows through the circuit as capacitor 104 is charged. These high currents may damage components in the power supply or cause disruption to the AC line source.

The prior art has dealt with this problem by introducing current limiting devices such as a current limiting resistor 106. Such devices prevent the in-rush current from exceeding a predetermined level and prevents damage to the components. The disadvantage of using a current limiting resistor is that the overall circuit efficiency is reduced due to the IR drop of the resistor. Thus, while the resistor is useful to control in-rush current surges, it decreases the efficiency of the circuit in steady state operation. Also, the circuit has poor voltage regulation as a function of load current.

One approach to solving the inefficiency problem is to use a negative temperature coefficient thermistor as the current limiting device. The thermistor resistance decreases as the device temperature increases. Thus, after the power supply has reached the steady state and the thermistor heat has increased, the resistance will be very low, providing an efficient circuit. The disadvantage of this device is that it will not reduce current surges caused by voltage surges at the AC source 101. Thus, the thermistor provides little circuit protection against voltage surges.

A second approach to limiting the efficiency impact of current limiter 106 is to introduce a switch 108 that provides a lower resistance circuit in parallel with the current limiting resistor. The switch, such as an SCR, is activated once the circuit reaches steady state so that the current limiting device is switched out of the circuit at steady state. This provides the advantages of an efficient circuit but still provides no protection against current surges occurring after startup.

Thus, there is a need for a current limiting circuit able to control both in-rush current and current surges caused by AC line voltage surges, and which operates efficiently as part of the power supply.

SUMMARY OF THE INVENTION

The present invention is directed to providing a current limiting circuit able to react to current surges during startup (in-rush surges), and to current surges caused by AC line voltage surges. The present invention is directed to providing a rectifier circuit that rectifies AC voltage from an AC voltage source and filters the rectified voltage through a capacitor. A current limiting circuit and a bypass circuit are formed in parallel. The bypass circuit includes a current sensor for sensing the current flowing in the bypass circuit. If the current level exceeds a specified maximum, a signal is generated causing a switch to open the bypass circuit causing all current to flow through the current limiting circuit. When current falls below a specified minimum, the switch is closed enabling the bypass circuit. The current sensor circuitry continues to sample the bypass circuit current and to cause the switch to open and close until a steady state, low current level is reached that allows the switch to be kept closed.

DESCRIPTION OF THE PREFERRED EMBODIMENT

Figure 1:
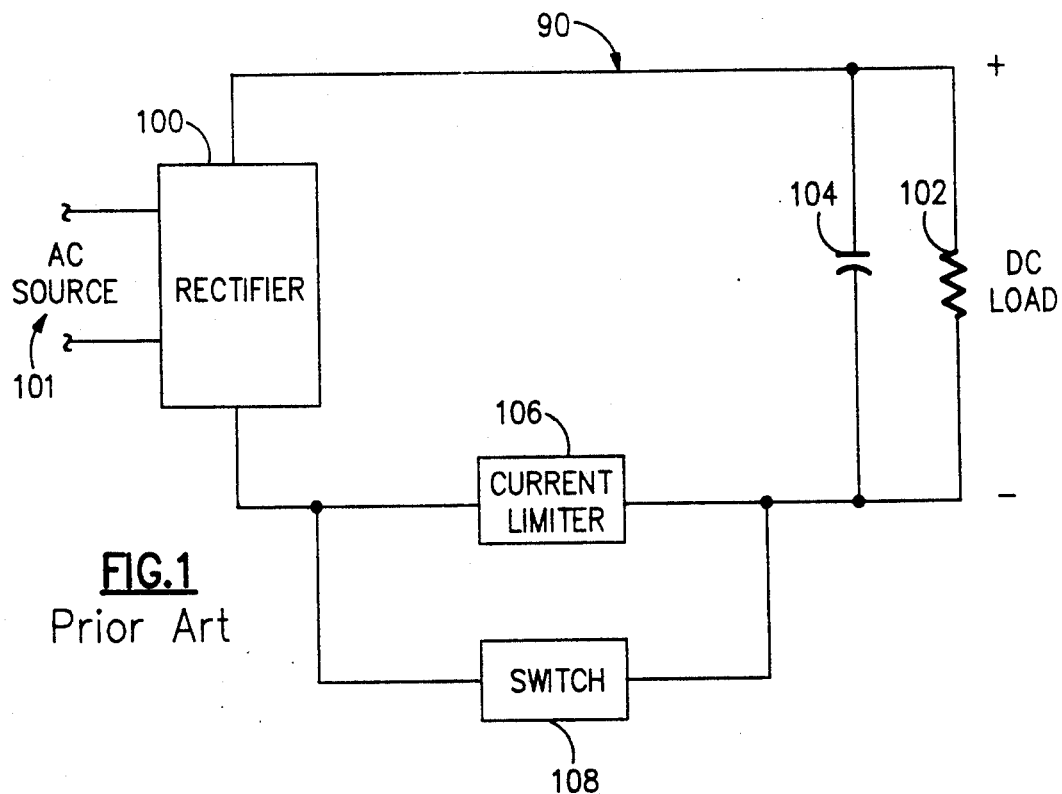
FIG. 1 is a block diagram of a prior art power supply with current limiting means.

The preferred embodiment will be described with reference to the figures in which corresponding elements are designated by the same reference numeral.

Figure 2:
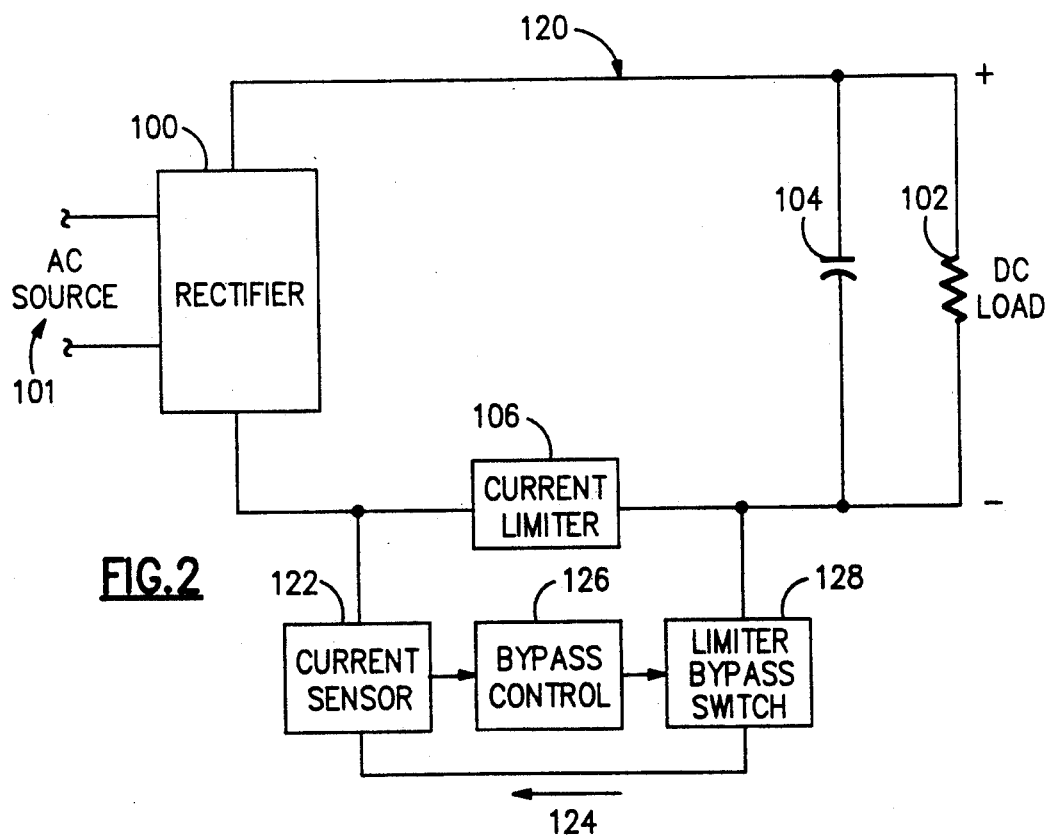
FIG. 2 is a block diagram of a power supply incorporating the present invention.

A power supply with a current limiting circuit according to the present invention is designated generally at 120 in FIG. 2. The current limiting circuit is used in connection with a rectifier 100, a filter capacitor 104, and DC load 102. While the present circuit is described in relation to these components, it could be used in other situations where there is a possibility of current variation and a need to control the current within certain bounds. The current limiter 106 is provided which, in the preferred embodiment, is a thermistor.

Current sensor 122 senses the current flowing through path 124. Based upon the level of current sensed, bypass control 126 signals limiter bypass switch 128 to open or close. Switch 128 controls whether the current flows through bypass circuit 124 or is restricted to flowing through current limiter 106.

A combination of current sensor 122 and bypass control 126 will allow the circuit of the present invention to control current flows during device startup as well as in reaction to voltage surges through the circuit.

Figure 3:
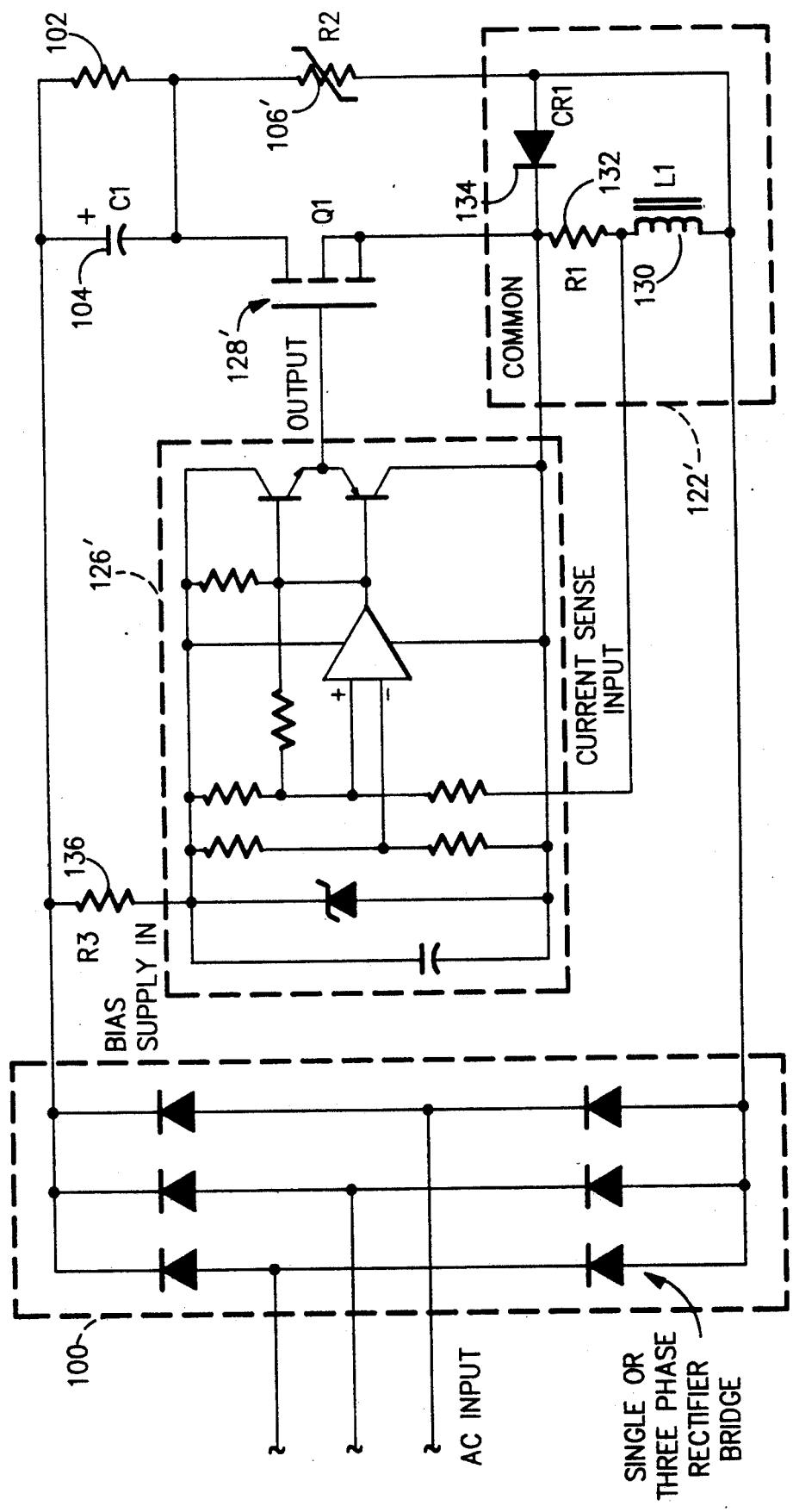
FIG. 3 is a circuit diagram of the preferred embodiment of the present invention.

FIG. 3 shows one embodiment of a circuit according to the present invention. In FIG. 3, the current limiting means 106 is thermistor 106'. The limiter bypass switch 128 is implemented using an FET 128'. The bypass control section is shown generally at 126' and the current sensor is shown generally at 122'.

The circuit of the present invention limits the current surges from the AC line to preselected values during initial turn-on and whenever AC line under voltage or over voltage transients occur. Peak AC line current flows through rectifier section 100 to the filter capacitor 104 and DC load 102 through two parallel circuit paths: one through current limiter 106' and the other through inductor 130, resistor 132 and FET 128' (this is the path shown at 124 in FIG. 2).

The circuit path 124 resistance when FET 128' is on, is set as low as possible to minimize the circuit loss. FET 128' is switched off whenever current exceeding a specified maximum current flows through path 124. The resistance 106' is set as high as possible to minimize the current flow through this branch when FET 128' is on, but the resistance must be low enough to clamp the voltage across the branch circuit to protect FET 128' from over voltage.

The value for resistor 106' can be obtained by dividing the difference of maximum permissible FET voltage and VMAX by the designed maximum branch circuit current through branch 124. The maximum branch circuit current can be obtained by subtracting VMAX divided by the value of resistor 106' from the required peak AC current surge.

Control circuit 126' is used to turn FET 128' on whenever the branch circuit current through 124 drops below a minimum value as chosen by the designer and will turn FET 128' off when the maximum branch circuit current 124 is reached. The control circuit 126' senses the current by looking at the IR drop across resistor 132. The control circuit may be powered up by using a bias resistor such as that shown at 136 or by using an alternate DC bias source.

During operation, when FET 128' turns on, the current will ramp up at a rate determined by VMAX divided by the value of inductor 130. When FET 128' turns off, the current from inductor 130 will decay at a rate determined by the IR drop of resistor 132, and the forward voltage drop of the clamp diode 134. When the current through 124 decreases below a set minimum, control circuit 126' will turn on FET 128'. The current will ramp up and when it reaches the maximum value, control 126' will immediately turn off FET 128'. The current sensor will therefore cause control circuit 126' to periodically turn FET 128' on to sample the current flow through branch circuit 124. As the difference between the line voltage and voltage across capacitor 104 VMAX decreases, FET 128' will remain on for longer periods of time, eventually staying on continuously until another current surge is detected.

While the present invention has been described with reference to certain components and values, it will be recognized that other components can be substituted without changing the invention. These descriptions were provided for illustration only and should not be construed in a limiting sense. The scope of this invention should be limited only by the language of the appended claims.

I claim:

1. A current limiting rectifier circuit, comprising:
    rectifier means for rectifying AC voltage from an AC line voltage source to produce DC voltage;
    capacitance means connected across said DC voltage for smoothing said DC voltage;
    current limiting means having high resistance for dissipating current surges connected in series with said capacitance means;
    bypass circuit means for bypassing said current limiting means, said bypass circuit means connected in parallel with said current limiting means creating a low resistance bypass circuit;
    said bypass circuit means having:
    current sensor means for sensing the current level in said bypass circuit and generating a control signal when said current sensor means detects current greater than a set maximum current value or less than a set minimum value; and
    switch means connected to said current sensor means for opening and closing said bypass circuit in response to said control signal from said current sensor means, said switch means operating to open said circuit when current in said bypass circuit exceeds said maximum value and to close said circuit when said current in said bypass circuit falls below said minimum value.

2. The circuit of claim 1 wherein said current limiting means is a resistor.

3. The circuit of claim 1 wherein said current limiting means is a negative temperature coefficient thermistor.

4. The circuit of claim 1 wherein said switch means is a field effect transistor (FET).

5. The circuit of claim 1 wherein said current sensor means comprises:
    resistance means for impeding current flow in said bypass circuit;
    comparator means for comparing a current flowing through said resistance means to said maximum current value;
    signal generating means for generating an "off" signal if said current flowing is greater than said maximum current value, and for generating an "on" signal when said current flowing is less than said minimum current value;
    inductance means for storing current and acting as a current source for said current sensor when said switch means is "off".

6. A current sensor circuit for sensing current flow in a circuit path and making or breaking said circuit path based on said sensed current flow, said circuit comprising:
    resistance means for impeding current flow in said circuit;
    sensor means for sensing current flow through said resistance means;
    control means for generating a control signal having a first value when said current flow sense by said sensor means is above a maximum value and having a second value when said sensed current flow is below a minimum value;
    switch means for making or breaking said circuit path, said switch means operating to break said circuit path in response to said first value of said control signal and to make the circuit otherwise; and
    inductance means for providing a current source to said resistance means when said circuit path is broken, wherein said sensor means, said switch means and said inductance means are connected in electrical series.

7. A circuit as claimed in claim 6 wherein said switch means is a field effect transistor.

* * * * *